Dec. 14, 1943.                S. SCHNELL                    2,336,891
                      FLUID PRESSURE CONTROL SYSTEM
                       Filed Jan. 14, 1942      2 Sheets-Sheet 1
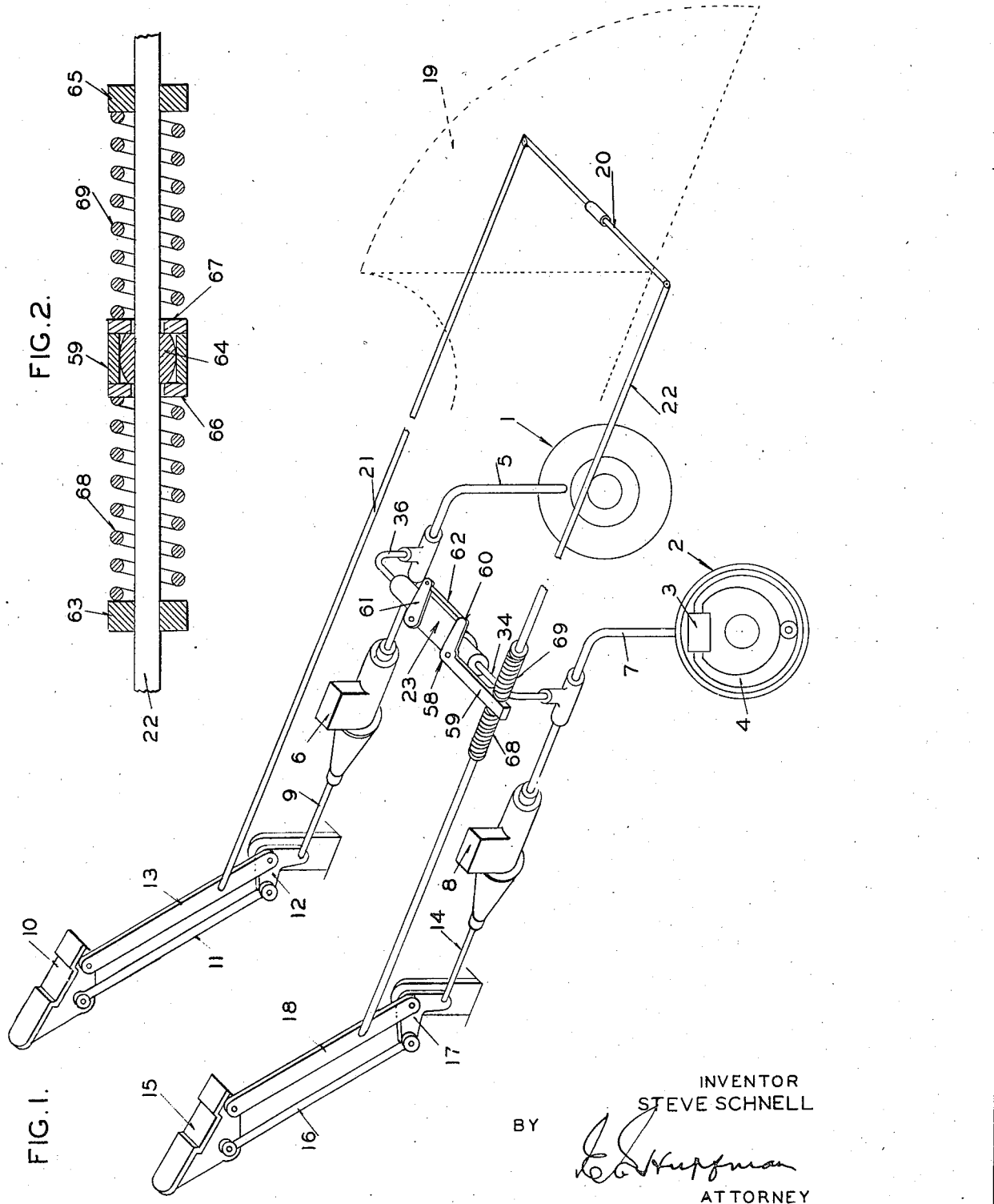
INVENTOR
STEVE SCHNELL
BY
ATTORNEY Dec. 14, 1943. S. SCHNELL 2,336,891
FLUID PRESSURE CONTROL SYSTEM
Filed Jan. 14, 1942 2 Sheets-Sheet 2
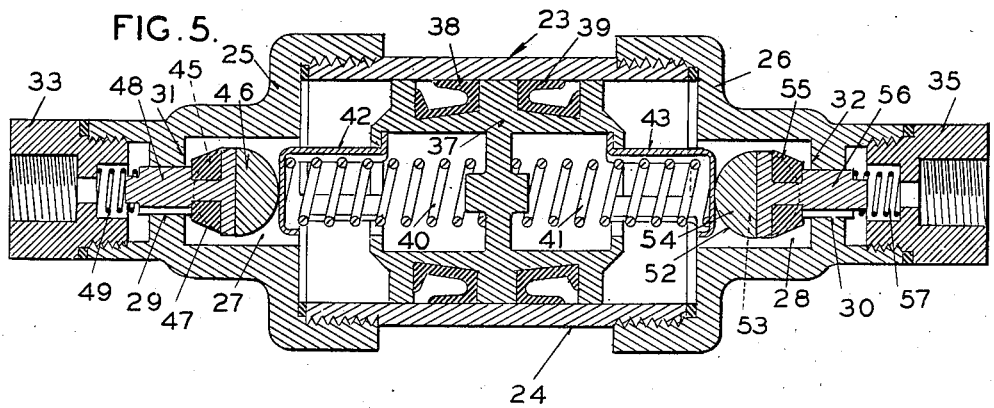
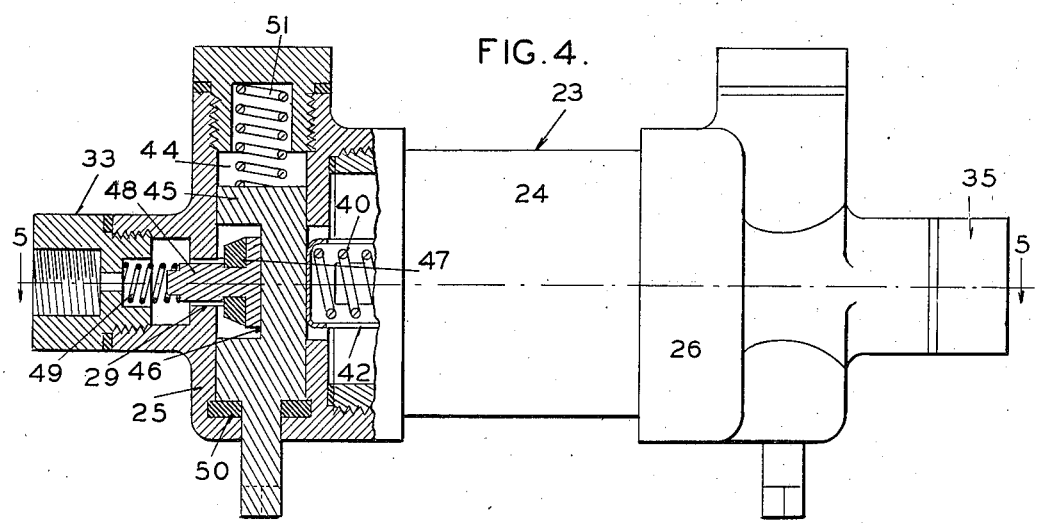
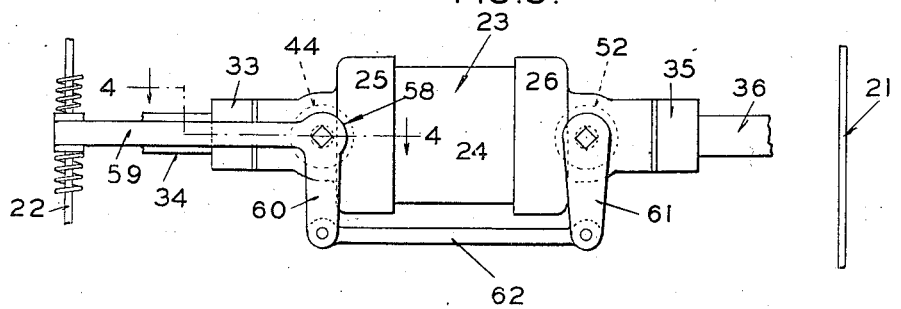
INVENTOR
STEVE SCHNELL
BY
ATTORNEY Patented Dec. 14, 1943

2,336,891

UNITED STATES PATENT OFFICE 2,336,891

FLUID PRESSURE CONTROL SYSTEM

Steve Schnell, Kirkwood, Mo., assignor to Wagner Electric Corporation, St. Louis, Mo., a corporation of Delaware Application January 14, 1942, Serial No. 426,700

13 Claims. (Cl. 244—50)

My invention relates to fluid pressure actuating systems and more particularly to systems for controlling certain devices, such as brakes.

One of the objects of my invention is to provide fluid pressure actuating means for at least two brakes which embodies two separate fluid pressure systems so associated with each other that equal fluid pressures can be applied to the brakes within predetermined limits.

Another object of my invention is to provide separate fluid pressure actuating means for two brakes and so associate them together for the purpose above noted and in such manner that either one of said brakes may be braked exclusively of the other, or one brake may be applied with greater fluid pressure than the other.

Another object of my invention is to provide improved control means for the brakes of an airplane.

Other objects of my invention will become apparent from the following description taken in connection with the accompanying drawings in which Figure 1 is a perspective view of a fluid pressure actuating means embodying my invention and showing same for controlling two brakes on an airplane; Figure 2 is an enlarged view of the connection for controlling valves of the equalizing means between the two brake systems; Figure 3 is a top view of the equalizing means; Figure 4 is a partial sectional view of the equalizing means, the section being taken on the line 4—4 of Figure 3; and Figure 5 is a sectional view, taken on the line 5—5 of Figure 4.

My invention is shown as embodied in a system for controlling the brakes of an airplane in accordance with the position of the rudder but such is by way of example only, as it may be embodied in a system for controlling the brakes of any desired vehicle or any equivalent devices.

Referring first to Figure 1, the numerals 1 and 2 indicate the two brakes associated with the right and left landing wheels of an airplane, each brake comprising a fluid motor 3 for actuating brake friction element 4. The fluid motor of brake 1 has connected thereto by conduit 5, a master cylinder 6 of known construction for producing at will fluid under pressure. The fluid motor of brake 2 has connected thereto by conduit 7, a master cylinder 8. The master cylinder 6 is actuated by a piston rod 9 and a treadle 10 connected to the rod by a link 11 and bellcrank lever 12. The treadle is pivotally mounted on the upper end of a rudder control lever 13, the lower end of which is pivoted to the same support as the bellcrank lever. The master cylinder 8 is actuated by a like structure comprising a piston rod 14 and a treadle 15 connected thereto by a link 16 and a bellcrank lever 17, said treadle being pivoted at the upper end of a rudder control lever 18. The rudder 19 of the airplane is shown as provided with a control bar 20, one end of which is connected by a link 21 to lever 13, and the other end of which is connected by a link 22 to lever 18.

It is seen that by means of the structure just described, the rudder may be swung to the right side of the pilot by operating the heel end of treadle 10 in order to move the rudder lever 13 forward, or it may be swung to the left side by operating the heel end of treadle 15 in order to move the rudder lever 18 forward. If it is desired to apply the right brake, this may be done by toe actuation of the treadle 10, or if it is desired to apply the left brake, such may be done by toe actuation of treadle 15.

If it is desired to apply both brakes simultaneously to stop the airplane when moving in a straight line, both treadles are toe actuated. However, with only the separate braking systems just described, the brakes cannot be actuated with any certainty by equal pressures unless the pilot is very careful in so actuating the toe ends of the treadles that each master cylinder will be caused to produce the same pressure. This, of course, is not likely because the pilot has other things to do besides trying to concentrate on actuating the brakes with equal pressure. Thus to enable the pilot to accomplish equal braking action on the brakes without the necessity of equal toe actuation of the treadles, I have associated with the two braking systems an equalizing means generally indicated by the numeral 23. This equalizing means does not permit any interchange of fluid between the two systems but is capable or permitting equal braking action on the brakes within certain predetermined limits and notwithstanding that one toe end of a treadle is moved more than the other. This equalizing means is also so controlled by the rudder control means that when the rudder is turned to one side and it is desired to brake only the wheel on that side to better accomplish the turning of the plane, then the equalizing means will be disabled.

Referring to Figures 3, 4 and 5, the equalizing means 23 comprises a cylinder 24 having threaded ends to which is secured like end members 25 and 26 having chambers 27 and 28, respectively, in communication with the adjacent ends of the cylinders and inlets 29 and 30 with which are associated valve seats 31 and 32. The inlet 29 is connected by a fitting 33 and conduit 34 with conduit 7 of the left brake actuating system, and the inlet 30 is connected by a fitting 35 and conduit 36 with conduit 5 of the right brake actuating system.

Within cylinder 24 is a piston 37 having packing elements 38 and 39 for preventing fluid from flowing past the piston in either direction. On opposite sides of the piston are springs 40 and 41 which have their outer ends engaged with spring retainers 42 and 43 cooperating with piston 37. These retainers hold the springs in place but do not interfere with the compressing of the springs as said retainers are so mounted that they can have relative movement toward the piston.

The end member 25 is provided with a cross bore 44 in which is mounted a shaft 45 extending to the exterior of the member. This shaft has a central cam portion 46 for controlling a movable valve element 47 which cooperates with valve seat 31 of inlet 29 to prevent fluid from entering the cylinder and acting on the near face of piston 37. The valve element has a fluted stem 48 with which cooperates a spring 49 for moving the valve element off the seat when permitted by the position (shown in Figure 5) of the cam portion on the shaft. The shaft is sealed by a gasket 50 and a spring 51 acts on the inner end of the shaft to hold a shoulder of the shaft against the gasket.

The end member 26 is also provided with a cross bore 52 in which is mounted a shaft 53 extending to the exterior of the member. This shaft has a central cam member 54 controlling a movable valve element 55 which cooperates with valve seat 32 of inlet 30 to prevent fluid from entering the cylinder and acting on the near face of piston 37. The valve element has a fluted stem 56 with which cooperates a spring 57 for moving the valve element off its seat when permitted by the position (shown in Figure 5) of the cam portion on shaft 53. Shaft 53 is sealed in the same manner as shaft 45.

The springs 40 and 41 and their retainers are so arranged with the piston that the overall length of the whole when the retainers are in their outer positions, is such as to fit between shafts 45 and 53 with retainer 42 engaging shaft 45 and retainer 43 engaging shaft 53. Thus the piston is normally maintained at the center of the cylinder 24.

The outer end of shaft 45 has secured thereto a bellcrank lever 58 having arms 59 and 60. The outer end of shaft 53 has secured thereto an arm 61, which arm is connected to arm 60 of the bellcrank lever by a link 62. Thus it is seen that the shafts are connected together for simultaneous rotation and can be rotated in either direction by moving arm 59 of the bellcrank lever. The connection between the shafts is such that their cam portions will be permitted, by valve elements 47 and 55, to be in open condition simultaneously, or in closed position simultaneously. The closing of the valve elements may be accomplished by a movement of arm 59 of the bellcrank lever in either direction from a position where both valve elements are open.

The free end of arm 59 of the bellcrank lever is provided with an opening to receive rod 22 connecting the rudder control lever 18 with the rudder bar 20. This rod 22 has secured thereto three spaced collars 63, 64 and 65, the central collar 64 being capable of moving through the opening in arm 59. On opposite sides of the collar 64 are washers 66 and 67 carried by the rod 22. A spring 68 is interposed between washer 66 and collar 63, and a spring 69 is interposed between washer 67 and collar 65. Thus it is seen by this connecting means between the bellcrank lever and rod 22 that the bellcrank lever can be moved in either direction in accordance with the movement of rod 22 and that the springs 68 and 69 permit the rod to move independently of the bellcrank lever when said lever has been moved a predetermined amount, which will be sufficient to rotate the shafts to control the valves as desired.

Referring to the operation of the structure described, the parts of the equalizing means will be in their positions shown when the rudder is in its central position and neither brake is applied. Under these conditions both valve elements 47 and 55 will be in unseated position and the piston 37 will be in the center of cylinder 24. If it should be desired to apply both brakes simultaneously and with equal pressure, the toe ends only of the treadles are actuated. This will cause both master cylinders to be actuated and fluid pressure developed to apply the brakes. Fluid pressure will also enter cylinder 24 on opposite sides of piston 37 as both valve elements are open. If the toe end of either treadle is not moved as far as the other, equal fluid pressure will nevertheless be effective in the fluid motors of both brakes. If there is a greater fluid pressure developed by master cylinder 6 than by master cylinder 8, piston 37 will move to the left, as viewed in Figure 5, and thus cause the fluid pressures in the two systems to equalize. If the master cylinder 8 develops more pressure, then piston 37 will move to the right and equalize the fluid pressures in the two systems. Of course, the equalizing action is limited by the extent of movement of piston 37 but this movement is such that there will be equal pressure on the brakes with only a reasonable attempt by the pilot to give the same amount of toe movement to both treadles. When the master cylinders are released, the springs 40 and 41 return piston 37 to its central position.

When the rudder is moved to assist in turning, both shafts 45 and 53 will be moved simultaneously and valve elements 47 and 55 caused to be positively held seated. Thus no fluid under pressure can enter the cylinder on either side of piston 37. If the rudder is turned to the right so as to turn the airplane to the right, then the right brake only should be employed in making this turn of the airplane. By actuating the master cylinder 6, this can be accomplished without fluid under pressure entering cylinder 24 and causing functioning of the equalizing means. If the rudder is turned to the left to turn the airplane to the left, the master cylinder 8 is actuated and brake 2 applied. Because of the closed condition of valve element 47, no fluid pressure will enter the cylinder.

If it should be desired to apply pressure to both brakes during turning but have one brake applied with a greater pressure than the other, this can be accomplished by proper toe actuation of the treadle. With the rudder turned, the equalizing means will be disabled and each braking system may be controlled as desired in the same manner as if there were no equalizing means. Whenever the rudder is placed in a straight line position, the equalizer will again come into action.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In control apparatus, two devices to be actuated, separate fluid pressure actuating means for the devices permitting independent actuation of said devices, means for equalizing the pressures of said actuating means when both are operated simultaneously and without interchange of fluid between the two actuating means, said equalizing means comprising two chambers divided by a movable wall with each chamber connected to communicate with a fluid pressure actuating means, a valve for controlling each communication connection, means for simultaneously closing said valves and preventing said chambers from being in communication with the fluid pressure actuating means with which they are connected, and manually-controlled means for actuating said last named means and including a yieldable member permitting greater manual movement than that necessary to close the valves.

2. In control apparatus, two devices to be actuated, separate fluid pressure actuating means for the devices permitting independent actuation of said devices, means for equalizing the pressures of said actuating means when both are operated simultaneously and without interchange of fluid between the two actuating means, said equalizing means comprising two chambers divided by a movable wall with each chamber connected to communicate with a fluid pressure actuating means, a third device to be actuated, means for actuating said device, means for cutting off said chambers from communication with the fluid pressure actuating means with which they are connected, and means for operating the cut-off means when said third device is actuated.

3. In a control system, two brakes, separate fluid pressure actuating systems for the brakes, means for equalizing the fluid pressures in the systems, a device separate from the brakes, means for actuating said device to different positions, and means connected to be controlled by said actuating means for said device and operable when said device is in one position for causing said equalizing means to be operative and when said device is in another position for causing said equalizing means to be inoperative.

4. In a control system, two brakes, separate fluid pressure actuating systems for the brakes, means for equalizing the fluid pressures in the systems comprising a floating member subject on opposite sides to the fluid pressure in the systems, a device separate from the brakes, means for actuting said device, valves for preventing the fluid pressures of both systems from acting on the floating member, and means for closing said valves by the actuating means for the device when said device is actuated to a predetermined position.

5. In a control system, two brakes, separate fluid pressure actuating systems for the brakes, means comprising a floating member having predetermined limits of movement for equalizing the fluid pressures in the systems as long as the difference between the pressures is below a predetermined value, a device separate from the brakes, means for actuating said device to different positions, and means connected to be controlled by the actuating means for said device and operable when said device is in one position for causing said equalizing means to be operative and when said device is in another position for causing said equalizing means to be inoperative.

6. In a control system, two brakes, fluid motors for actuating the brakes, a separate source of fluid pressure for each fluid motor, conduit means between each source and its fluid motor, an equalizing means associated with the conduit means and comprising a cylinder connected at one end to one conduit means and at the other end to the other conduit means, a piston in the central part of said cylinder having limited reciprocation in opposite directions, springs on opposite sides thereof to normally bias it to a central position, a valve associated with each end of the cylinder, means for simultaneously controlling said valves so that they may both be open or closed at the same time, a device separate from the brakes, means for actuating said device to different positions, and means operable by the last named means for causing said valves to be open when the device is in one position and closed when the device is in another position.

7. In a control system for an airplane having brakes for the two landing wheels, separate means for actuating the brakes independently and comprising two operator-operated members for varying the pressure transmitted to the brakes, means for equalizing the pressures transmitted to the brakes in the event the two operator-operated members are so controlled that in the absence of the equalizing means the brakes would have unequal pressure, and means for disabling said equalizing means by the operation of a control means for operating a member employed in controlling the operation of the airplane.

8. In a control system for an airplane having brakes for the two landing wheels and a rudder, rudder control means, separate means for actuating the brakes independently and comprising two members movable by the operator, means for equalizing the pressures transmitted to said brakes by the actuating means notwithstanding the operator may move one of the members more than the other, means for disabling the equalizing means, and means operable by the rudder control means for causing the disabling means to be effective when the rudder is turned from its position coinciding with a longitudinal line of the airplane.

9. In a control system for an airplane having brakes for the landing wheels, separate fluid pressure actuating systems for the brakes including two operator-operated members each movable different distances to produce different pressures, an equalizing means associated with the two systems for equalizing the pressures therein when one of the operator-operated members is moved a greater distance than the other, means for disabling said equalizing means, a control member for a part of the airplane other than the brakes, and means for causing the disabling means to disable the equalizing means when the control member is operated to a predetermined position.

10. In a control system for an airplane having brakes for the landing wheels and a rudder, separate fluid pressure actuating systems for the brakes including two operator-operated members each movable different distances to produce different pressures, an equalizing means associated with the two systems for equalizing the pressures therein when one of the operator-operated members is moved a greater distance than the other, means for disabling said equalizing means, control means for the rudder, and means for causing the disabling means to disable the equalizing means when the rudder is moved by its control means to a position out of line with a longitudinal line of the airplane.

11. In a control system for an airplane having brakes for the landing wheels and a rudder, separate fluid pressure actuating systems for the brakes, equalizing means connected to the systems for equalizing the pressures thereof in the event the operator so controls said systems that there would be different fluid pressures in the event the equalizing means were not present, said equalizing means comprising a floating member having one side communicating with one system and the other side communicating with the other system, valves for cutting off communication between the opposite sides of the floating member and the systems, and means for closing said valves only when the rudder is moved from its position in line with a longitudinal line of the airplane.

12. In a control system for a vehicle having wheels on opposite sides thereof provided with brakes, separate fluid pressure actuating systems for the brakes each including a foot operated treadle pivotally mounted on a lever and connected to control the pressure in the system by toe actuation of said treadle, means for equalizing the pressures in the systems when the treadles are so toe-actuated that different fluid pressures would be present if the equalizing means were not present, means for actuating a control element of the airplane by movement of the levers on which the treadles are pivoted, and means operable when the control element of the airplane is moved to a predetermined position by the levers for disabling the equalizing means.

13. In a control system for an airplane having a rudder and landing wheels provided with brakes, separate fluid pressure actuating systems for the brakes each including a foot operated treadle pivotally mounted on a lever and connected to control the pressure in the system by toe actuation of said treadle, means for equalizing the pressures in the systems when the treadles are so toe-actuated that different fluid pressures would be present if the equalizing means were not present, means for actuating the rudder by movement of the levers on which the treadles are pivoted, and means operable only when the levers so move the rudder that it is out of line with a longitudinal line of the airplane for disabling the equalizing means.

STEVE SCHNELL.